United States Patent [19]
Glinter et al.

[11] Patent Number: 5,577,805
[45] Date of Patent: Nov. 26, 1996

[54] VAN-TYPE VEHICLE SEAT

[75] Inventors: Jeffrey A. Glinter, Waterford; Gary A. Wize, Shelby Township, Macomb County, both of Mich.

[73] Assignee: General Motors Corporation, Detroit, Mich.

[21] Appl. No.: 541,649

[22] Filed: Oct. 10, 1995

[51] Int. Cl.⁶ ........................... B60N 2/02; B60N 2/04
[52] U.S. Cl. ............... 297/378.12; 297/335; 296/65.1
[58] Field of Search ............... 297/378.12, 335, 297/334, 336, 354.12, 361.1; 296/65.1, 65 R

[56] References Cited

U.S. PATENT DOCUMENTS

| | | | |
|---|---|---|---|
| 3,880,464 | 4/1975 | Murphy et al. | 297/326 |
| 4,484,776 | 11/1984 | Gokimoto et al. | 296/65 R |
| 4,627,656 | 12/1986 | Gokimoto et al. | 296/65 R |
| 4,636,003 | 1/1987 | Siebler | 297/336 |
| 4,700,989 | 10/1987 | Ercilla | 297/331 |
| 4,925,229 | 5/1990 | Siebler | 296/65.1 |
| 5,240,309 | 8/1993 | Köjer | 297/378.12 |
| 5,380,060 | 1/1995 | Sponsler et al. | 297/378.12 |
| 5,393,116 | 2/1995 | Bolsworth et al. | 297/65.1 |

*Primary Examiner*—Peter M. Cuomo
*Assistant Examiner*—Anthony D. Barfield
*Attorney, Agent, or Firm*—Ernest E. Helms

[57] ABSTRACT

A vehicle seat is provided which includes a riser assembly; a floor latch for joining a rear leg to a vehicle floor releasable by a pull cable; a seat back bracket joined to the riser having first, second and third pins connected thereto and a first slot; a seat back foldable from an upright position to a fold position pivotally connected to the seat back bracket via the first pin, and the seat back having a connected fourth pin captured within the seat back first slot; a pawl connected to the third pin angularly biased toward the fourth pin when the seat back is in an upright position; a release lever connected to the seat back bracket having a handle and first and second fingers bifurcated by a slot which accepts the fourth pin, one of the fingers having a tab to remove the lock pawl from engagement with the fourth pin when the seat back is moved to the folded position from the upright position; a first link pivotally connected to the seat back bracket; and a second link pivotally joined to the release lever and to the first link.

10 Claims, 5 Drawing Sheets

VAN-TYPE VEHICLE SEAT

FIELD OF THE INVENTION

The field of the present invention is that of removable type seating for van-type vehicles and methods of utilization thereof. More particularly, the field of the present invention is that of van-type seats which have a fold down position to accommodate storage or to provide a table surface for the remainder of the seated occupants.

BACKGROUND OF THE INVENTION

In van-type, especially minivans, it is known to have seating which is removable from the van to increase the cargo capacity thereof. Additionally, it is also known to have removable seats which have a fold down position which accommodate storage or provide a table surface for the other van occupants. An example of such a van-type seat is found in Bosworth et al, U.S. Pat. No. 5,393,116, commonly assigned.

SUMMARY OF THE INVENTION

The present invention provides an alternative to the van-type vehicle seat provided by Bosworth et al which additionally is more suitable for an all-belts-to-seat design wherein the vehicle seat belt is anchored to the vehicle seat and not to the floor or a roof pillar of the vehicle.

DESCRIPTION OF THE PREFERRED EMBODIMENT

Figure 1:
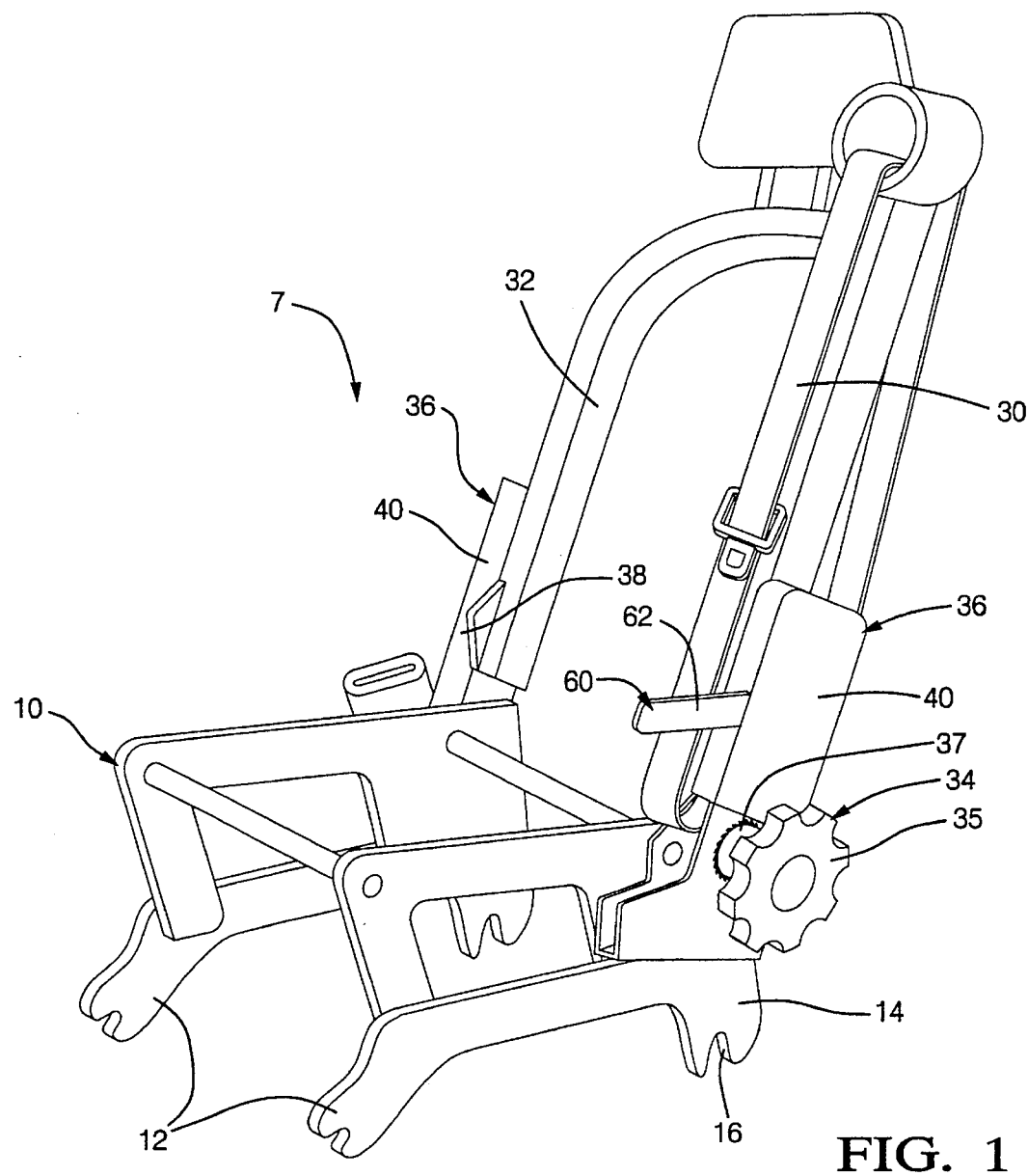
FIG. 1 is a perspective view of a preferred embodiment seat according to the present invention with the cushion material removed for clarity of illustration showing the frame of the present invention prior to attachment to a vehicle floor.
Figure 5:
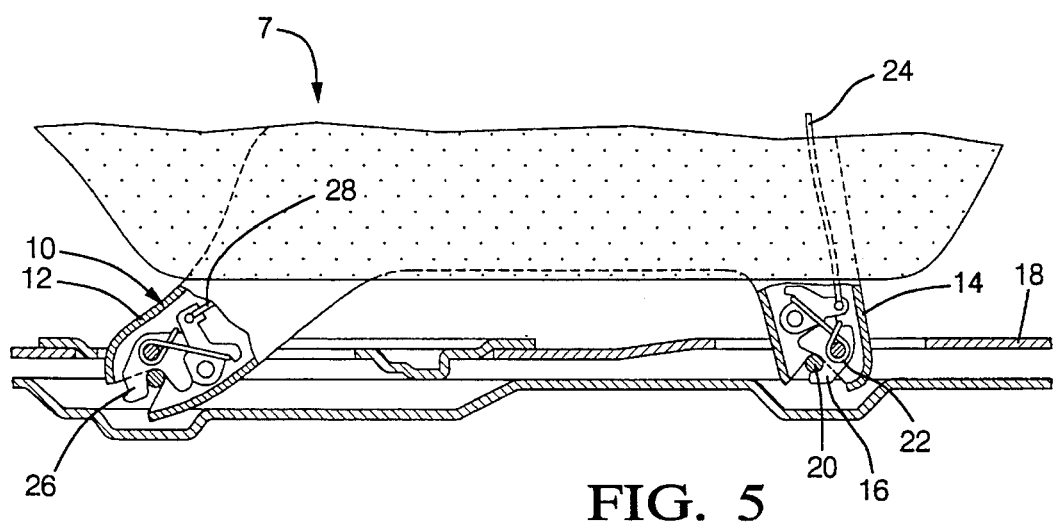
FIG. 5 is a side elevational sectional view with portions sectioned of a vehicle seat showing its latching arrangement to join the seat to the vehicle floor.

Referring to FIGS. 1 through 5, a van-type vehicle seat 7 according to the present invention has a riser assembly 10 which includes a set of front legs 12 and rear legs 14. The rear legs 14 each have a latch assembly 16 which allows the rear legs to be joined to a vehicle floor 18 by grasping a floor cross pin 20. The latch may optionally be similar to that described in aforementioned Bosworth et al or a modification thereof. The latch assembly 16 is biased to an engaged position by a spring 22. A pull on a release cable 24 is required to release the latch assembly 16.

The vehicle seat 7 also has a front leg latch assembly 26 which optionally may be released by a cable 28. However, other latch mechanisms may be utilized.

The vehicle seat 7 includes a combination lap and shoulder belt restraint 30 which provides shoulder and lap belt restraint functions. The restraint belt 30 is totally contained by the vehicle seat 7 and is not anchored to the vehicle floor 18 or to a vehicle roof pillar, hence the designation that seat 7 is an all-belts-to-seat type vehicle seat.

Pivotally joined to the riser assembly 10 via a conventional gear tooth recliner adjuster 34 is a seat back bracket assembly 36. The recliner adjuster 34 may be similar to the adjusters described in U.S. Pat. Nos. 4,598,947; 4,634,181; 4,668,013 and 4,715,656 and includes a handle 35 which powers a gear 37. The gear 37 is eccentrically mounted within and meshed with an outer gear (not shown) which is fixed with respect to the seat back bracket 36. The seat back bracket 36 has an inner (inboard) surface 38 joined to an outer surface 40 to form a box-like structure.

The seat back bracket assembly 36 has a first pin 42, a second pin 44 and a third pin 46 which extends from its inboard wall 38. Additionally, the seat back bracket assembly has an anchor pin 49.

Pivotally mounted to the bracket assembly 36 via pin 42 is a seat back frame 32. Seat back frame 32 has joined thereto a fourth pin 48 which is captured in an arcuate slot 50 of the bracket assembly which has a radial center line generally coterminous with pin 42.

Figure 2A:
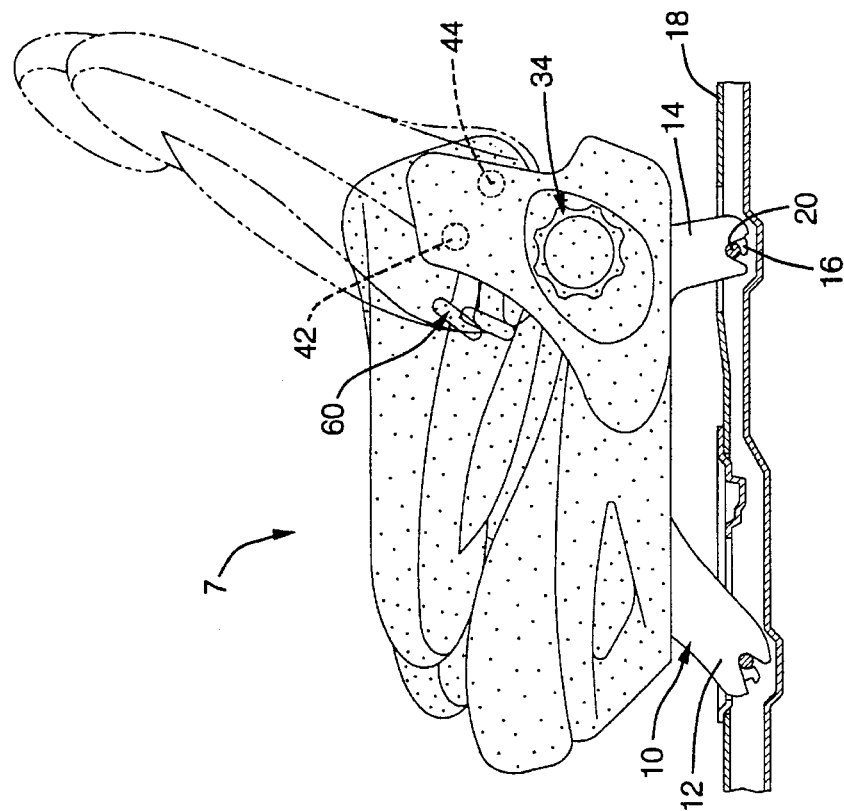
FIGS. 2A, 2B, 2C and 2D are side elevational views illustrating the various positions of the vehicle seat according to the present invention.
Figure 2B:
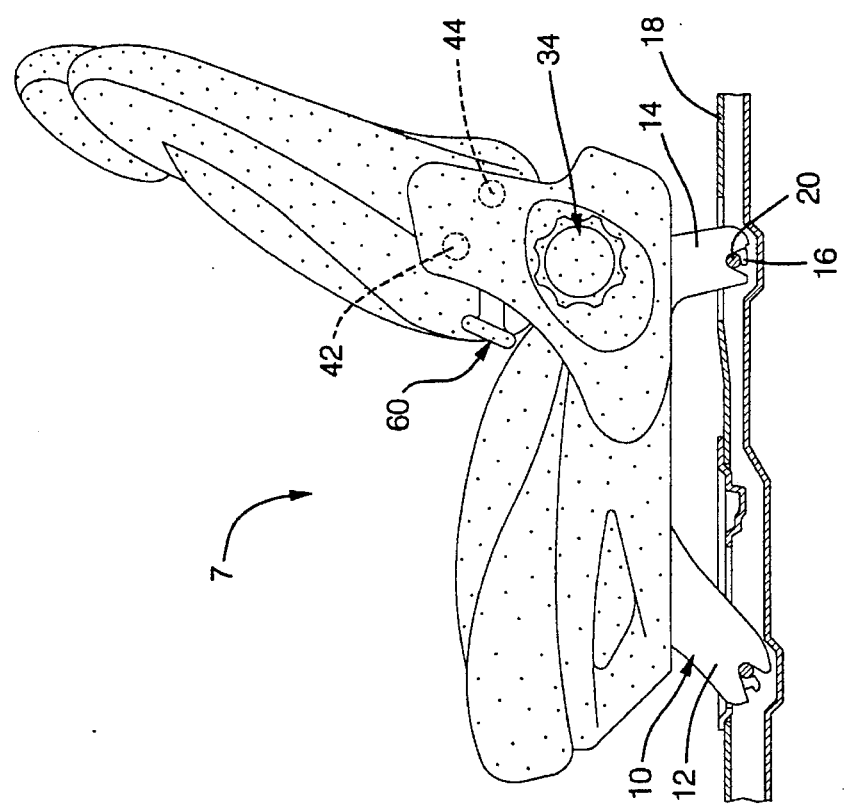
Figure 2D:
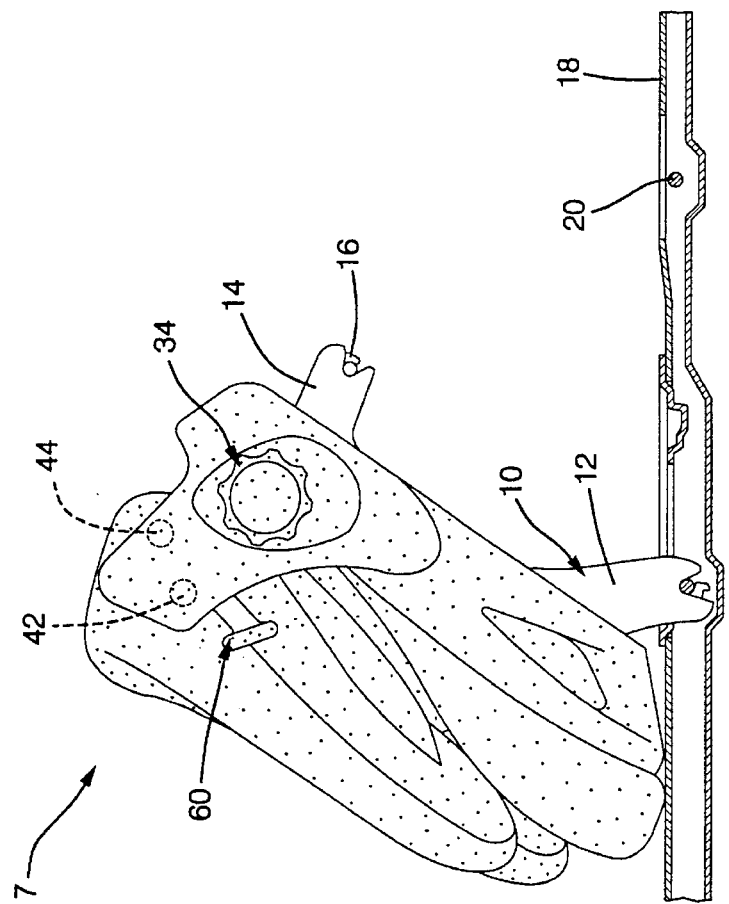
Figure 2C:
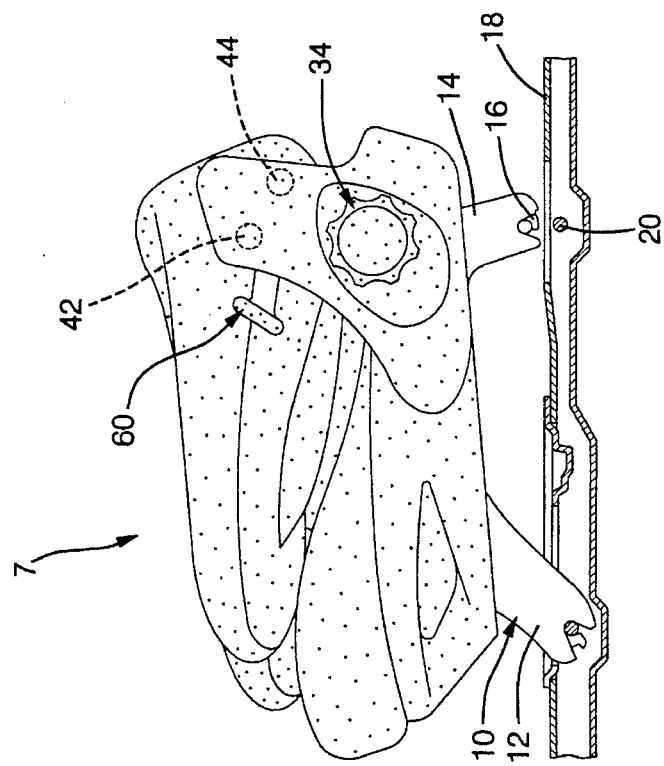
Figure 3A:
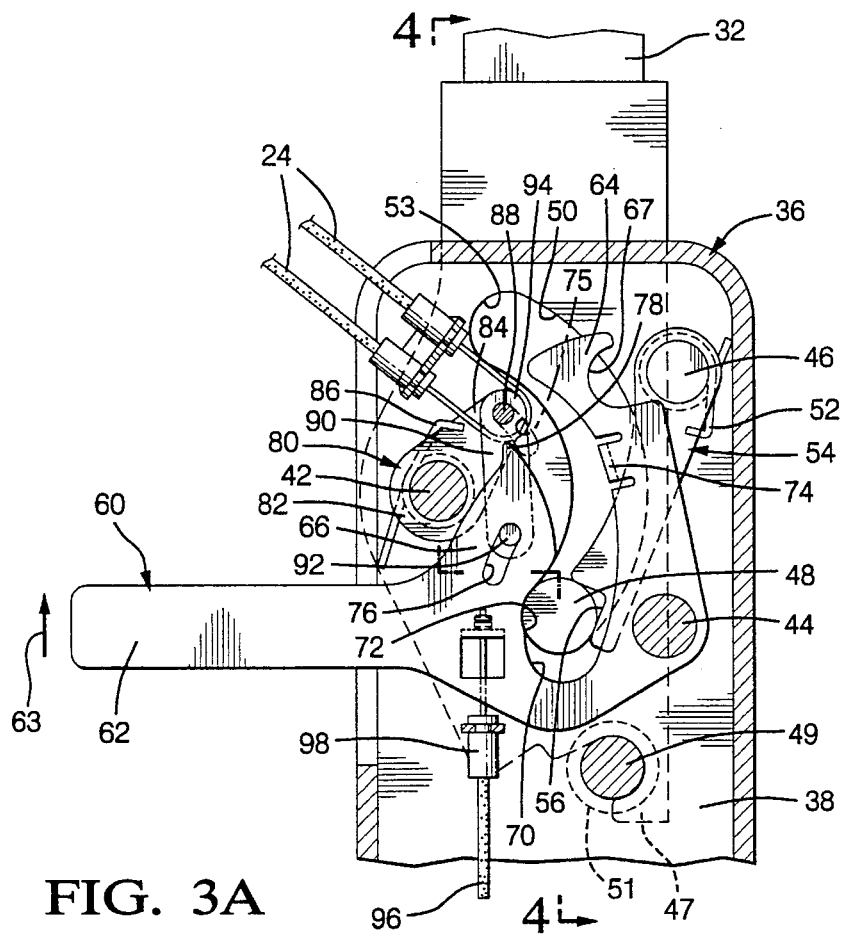
FIGS. 3A, 3B and 3C illustrate a seat back positioning adjuster mechanism of the vehicle seat shown in FIGS. 2A, 2B and 2C, respectively.
Figure 3B:
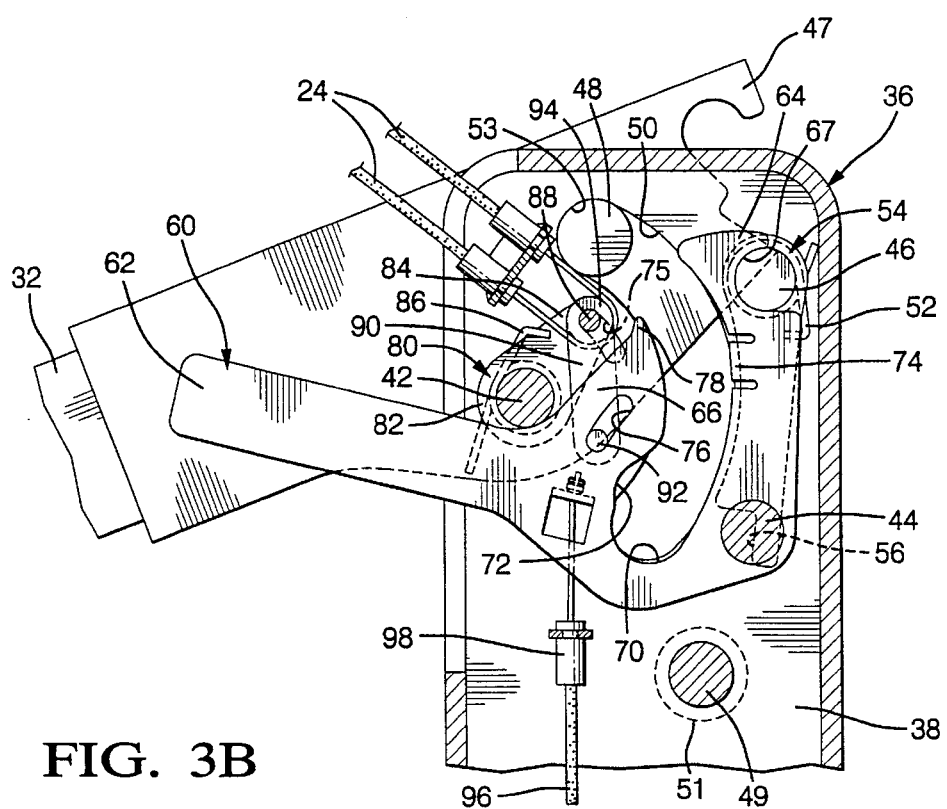

Pivotally connected to the pin 42 and biased in a clockwise orientation by a spring 52 is a locking pawl 54. The locking pawl 54 has a generally L-shaped compound surface 56 for two point contact with the pin 48 to retain the seat back frame 32 in its upright position as shown in FIGS. 2A and 3A.

Pivotally joined via pin 44 to the bracket assembly 36 is a release lever 60. Release lever 60 has a handle 62 integrally joined to a first finger 64 and a second finger 66. The first finger 64 is bifurcated from the second finger 66 by a first release lever slot 70. Slot 70 has a cam cutout portion 72 which, in the normal rest upright position shown in FIG. 3A, is allowed to entrap the pin 48.

The release lever 60 first finger also has an inward directed tab 74. The second finger 66 also has a second release lever slot 76 punched therein. The release lever second finger additionally has a tip 78.

Also pivotally joined to pin 42 is a first lever 80 having a second end 82 adjacent the pin 42 in a first end 84. End 84 is biased in a clockwise direction by a torsion spring 86. First lever 80 is pivotally connected via a fifth pin 88 to a second link 90 which has a first end connected to the pin 88 and a second end connected to a sixth pin 92 which is captured within the slot 76. Pin 88 is also associated with a drum 94 which has wrapped around it a continuous end of the release cables 24 which are then routed to both rear leg latch mechanisms 16. A slave cable 96 goes through a guide 98 affixed with the bracket assembly 36 and is thereafter connected to the release lever 60 to control a similar bracket assembly 36 on the other side of the vehicle seat 7.

In a normal position, the seat back frame 32 is held in position by engagement of the lock pawl 54 against the fourth pin 48. Additionally, the lever 60 is held in position by virtue of the cam surface 72 contact with the pin 48. To provide stability in a crash-type situation for crash-type loading, not only will the lock pawl 54 prevent forward pivotal motion, forcing most of the force in a line generally parallel to the lock pawl acting through pin 46. The entrapment of a hook portion 47 about the pin 49 takes up twist-type loading by virtue of the anchor head 51.

Figure 3C:
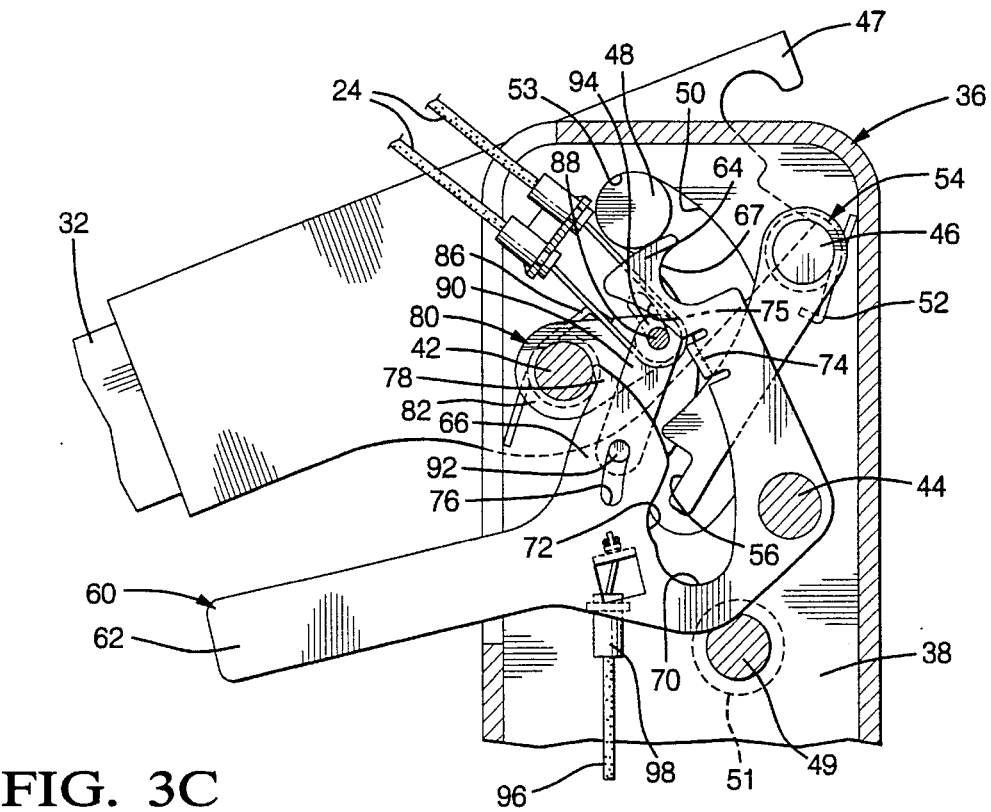
Figure 4:
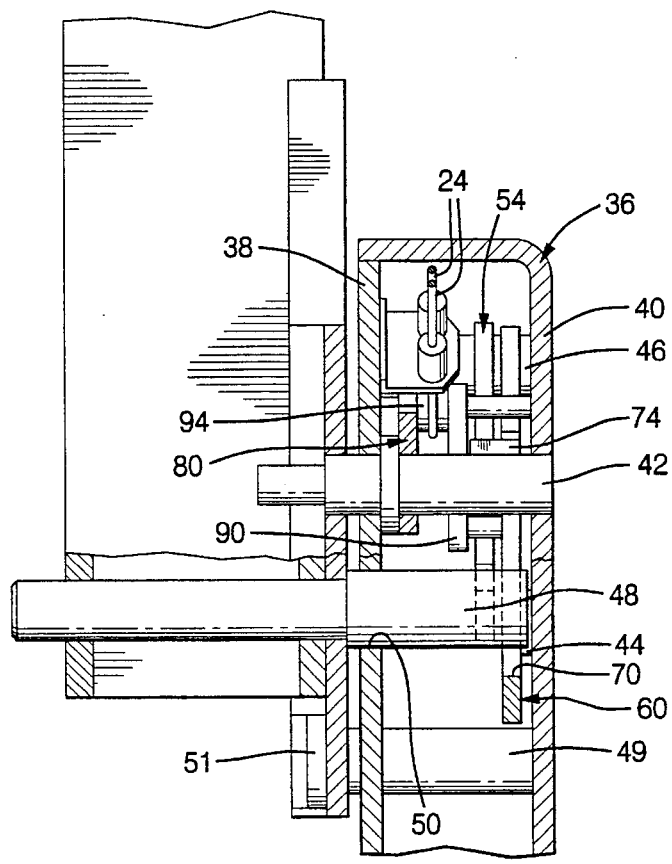
FIG. 4 is a sectional view taken along line 4—4 of FIG. 3A.

To rotate the seat back 32 to its folded position, the handle 62 of the release lever is moved in a first angular direction (clockwise), causing the tab 74 of the first finger to remove the locking pawl, thereby allowing the pin 48 to proceed to a far end 53 of the slot 50. The movement of the hand lever 60 is such that it can overcome the biasing force provided on the lock pawl 54. Therefore, the pin 48 will come out of the cam surface 72 upon the rotation of the handle in the first direction 63. Over-travel will be prevented by a cutout portion 67 of the first finger engagement with the pin 46. To release the rear legs 14 from engagement with the vehicle floor to allow the vehicle seat 7 to move to the position shown in FIG. 2C from FIG. 2B, the release lever 60 will be moved counterclockwise as shown in FIG. 3C, causing the pin 92 to be pulled downwardly, pulling down the second link 90 and pulling over the first link 80. Upon the pull of the cable 24, the rear legs will release and the cable 24 will remain essentially slack, thereby allowing the torsion spring 86 to keep the first link 80 in its clockwise orientation. This position of the lever as shown in FIG. 3C in a clockwise orientation prevents the seat back 32 from rising to its upright position until re-engagement of the rear legs 14. Therefore, no one may sit in the seat 7 until the rear legs 14 are firmly attached to the vehicle floor.

In the upright position as shown in FIG. 3A, the rear legs 14 cannot be released due to the placement of the pin 48 within the cam surface 72 of the release lever, preventing the release lever 60 from being pulled downwardly. The release lever 60 may be pulled upwardly even though the first link 80 is biased to the right since the biasing force of spring 86 is overcome by the pull on cables 24, which brings the drum 94 in a counterclockwise positioning, assuring clearance of the tip 78 about the drum 94. The slots 76 and 75 (provided in the bracket assembly 36) ensure the proper orientation of the first and second links 80 and 90.

It will be apparent to those skilled in the art that the various pins and slots of the bracket assembly 36 may be switched from side to side as design criteria may dictate.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A vehicle seat which may be releasably mounted to a vehicle floor comprising:

a riser assembly having front and rear legs;

a floor latch assembly for joining the rear leg to a vehicle floor, the floor latch assembly being released by a pull on a leg latch release cable;

a seat back bracket assembly joined to the riser assembly, the seat back bracket assembly having first, second and third pins connected thereto, the seat back bracket assembly having a first arcuate slot with a radial center generally coterminous with the first pin;

a seat back foldable from an upright position to a fold position placing the seat back more adjacent to the riser assembly, the seat back being pivotally connected to the seat back bracket assembly via the first pin, and the seat back having a fourth pin connected thereto captured within the first arcuate slot of the seat back bracket assembly;

a locking pawl pivotally connected to the third pin and angularly biased toward contact with the fourth pin when the seat back is in an upright position to lock the seat back in an upright position;

a release lever pivotally connected to the seat back bracket assembly via the second pin, the release lever having a handle and first and second fingers bifurcated by a first slot which accepts the fourth pin, one of the fingers having a tab to remove the lock pawl from engagement with the fourth pin when the seat back is moved to the folded position from the upright position when the release hand is moved in a first angular direction;

a first link with first and second ends, the first link second end being pivotally connected to the seat back bracket assembly and the first link first end being angularly biased to place the first link first end in a position adjacent the second finger of the release lever to prevent the release lever from being moved in the first angular direction when the rear leg floor latch assembly is not joined to the vehicle floor, the first link first end being operatively associated with the leg latch release cable; and a second link pivotally joined to the release lever and to the first link whereby movement of the release lever in a second angular direction opposite the first angular direction causes the second end of the first link to pull the cable to release the rear leg latch assembly, thereby releasing the rear legs from the vehicle floor.

2. A vehicle seat as described in claim 1 wherein seat belts are directly connected to the vehicle seat.

3. A vehicle seat as described in claim 1 wherein the release lever second finger has a cam surface entrapping the fourth pin when the seat back is in the upright position.

4. A vehicle seat as described in claim 1 wherein there are at least two rear legs with two floor latch assemblies and there is a common cable associated therewith which is operatively associated with the first end of the first link.

5. A vehicle seat as described in claim 1 wherein there is a fifth pin pivotally connecting the first and second links and the fifth pin is captured in a second slot within the bracket.

6. A vehicle seat as described in claim 5 wherein when the seat back is in a folded position, the seat back cannot be raised to the upright position unless the rear leg latch assembly is joined to the vehicle because of contact with a portion of the second finger with the fifth pin.

7. A vehicle seat as described in claim 1 wherein there is a sixth pin which pivotally connects the second link to the release lever and the sixth pin is captured within a second slot of the release lever.

8. A vehicle seat as described in claim 1 wherein the first link second end is pivotally attached to the first pin.

9. A vehicle seat as described in claim 1 wherein the bracket assembly has an anchor pin and the seat back in the upright position has a hook restrained both angularly and in an orientation lateral with respect to the vehicle seat by the anchor pin.

10. A vehicle seat as described in claim 1 wherein the vehicle seat has means for reclining the bracket assembly with respect to the riser assembly.

* * * * *